Dec. 13, 1955  H. F. MERRIAM ET AL  2,726,933
PRODUCTION AND USE OF SULFUR DIOXIDE
Filed Jan. 9, 1952  2 Sheets-Sheet 2
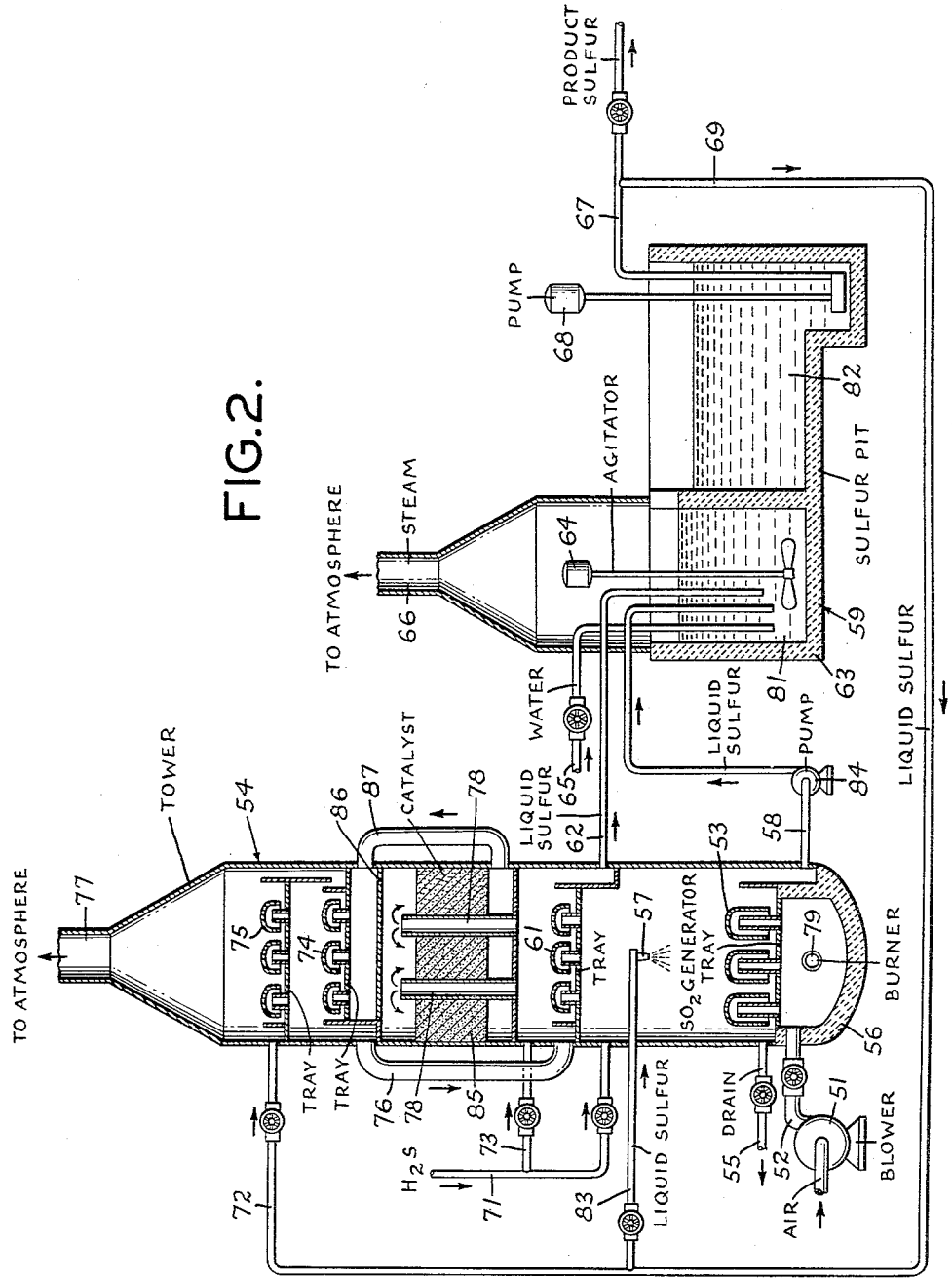
INVENTORS.
HENRY F. MERRIAM
HOWARD H. HURMENCE
BY
Ernest A. Polin
ATTORNEY.

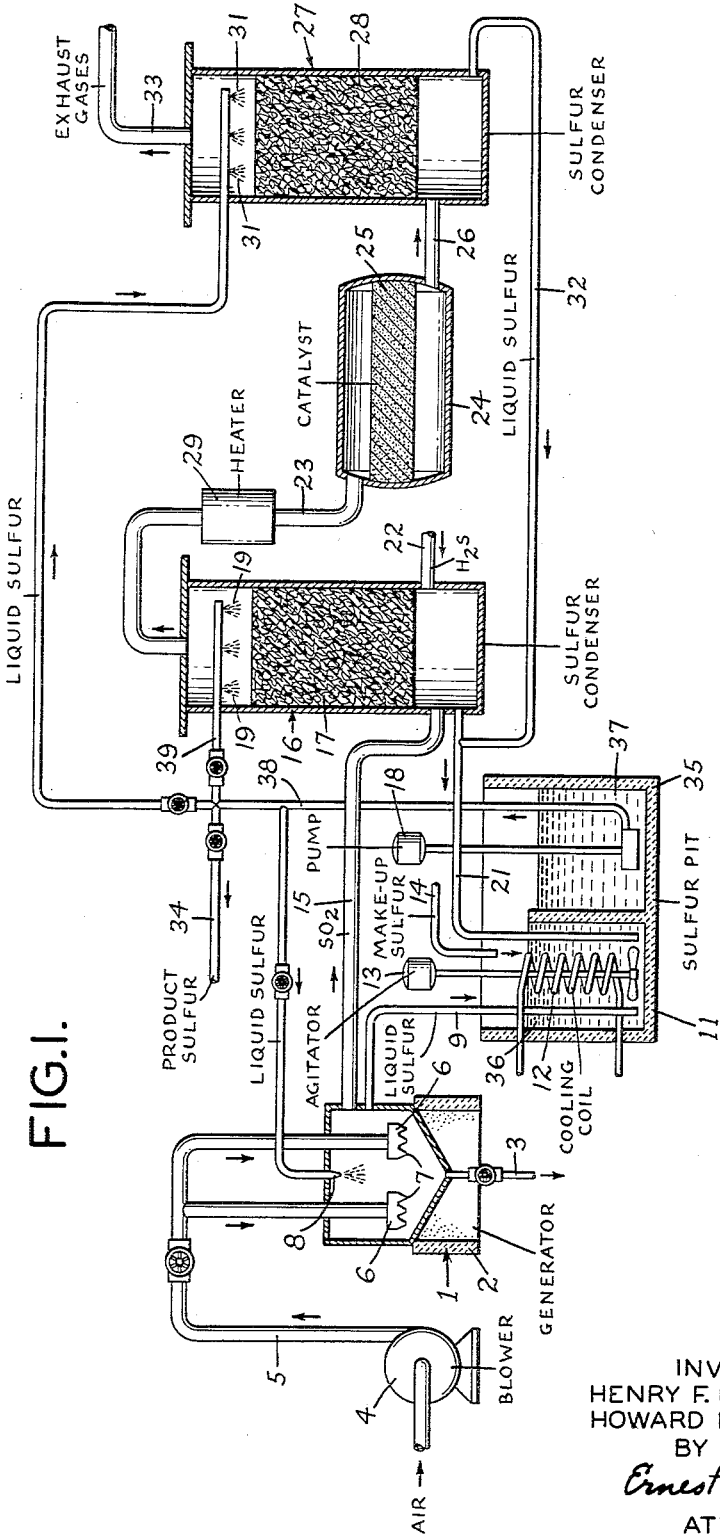

United States Patent Office 2,726,933
Patented Dec. 13, 1955

2,726,933

PRODUCTION AND USE OF SULFUR DIOXIDE

Henry F. Merriam and Howard H. Hurmence, West Orange, N. J., assignors to Allied Chemical & Dye Corporation, New York, N. Y., a corporation of New York Application January 9, 1952, Serial No. 265,644

6 Claims. (Cl. 23—179)

The present invention relates to process for combustion of elemental sulfur to produce high quality sulfur dioxide free or reasonably so of sulfur and oxygen. According to certain aspects of the invention, sulfur dioxide produced is used under controlled conditions to oxidize gaseous sulfides to form recoverable elemental sulfur and the elemental sulfur employed in the aforementioned process.

Production of sulfur dioxide containing little or no free oxygen and sulfur has in the past presented substantial design and operational difficulties. Relative freedom from both these substituents has been realizable by space combustion at high flame temperature, typically of the order of 2800° F., within large volume combustion zones when employing precisely controlled ratios of sulfur and oxygen. Removal of combustion heat, control of furnace wall temperatures, and cooling of hot combustion gases have dictated adoption of extensive auxiliary plant including waste heat boilers and other cooling circuits representing substantial operating and maintenance as well as investment costs.

On the other hand, combustion of liquid sulfur effected within a body of the same has resulted in a stream of gaseous product heavily laden with vaporized elemental sulfur which is undesirable for certain uses to which sulfur dioxide is well adapted. Also, such sulfur tends to deposit as liquid or as solid upon surfaces of equipment, creating or aggravating operational and design difficulties.

Among objects of the present invention is production of high quality sulfur dioxide which does not tend to form sulfur deposits, and which contains otherwise acceptably low quantities of sulfur, even substantially none, as well as being substantially free of oxygen.

The invention has for further objects such other improvements and such other operative advantages or results as may be found to obtain in the process or apparatus hereinafter described or claimed.

In accordance with the invention, oxygen supplied in a stream of gas is brought into contact with liquid sulfur maintained at auto-ignition temperature within a reaction zone comprising a pool of that material. Resultant gases comprising sulfur dioxide are contacted further with liquid sulfur having temperature below auto-ignition level for time and at other conditions adequate to substantially reduce the temperature of those gases. It has been found in practice of the invention that there is produced sulfur dioxide containing desired low quantities of free sulfur and free oxygen down to practical freedom from both, in concentrations consistent with the concentration of oxygen in the stream of gas reacted with the liquid sulfur, e. g. of the order of about 20–21% when that gas is air.

In preferred operation, the oxygen-laden gaseous material is introduced to a combustion zone within a relatively deep pool of liquid sulfur sufficiently below its top surface, for example, at or adjacent the bottom of the pool, that all or substantially all of the oxygen is consumed during passage of the gas toward that surface. Hot liquid sulfur continuously withdrawn from the pool at auto-ignition temperature is cooled in an external cooling zone to substantially below such temperature and returned to the pool, at such circulation rate as to remove heat of combustion of the sulfur burned and additionally to cool sulfur dioxide-containing product to desired extent, even to below minimum auto-ignition temperature of sulfur, if desired. The cooled liquid sulfur may be intimately contacted with product gases during its movement toward the combustion zone, as prior to admission to the pool, thereafter, or both. Resultant cooled gas is substantially free of oxygen and contains substantially reduced quantities of free sulfur. If the gases are cooled by the process of the invention to temperatures below minimum auto-ignition temperature, by say about 200° F. or more, then their sulfur content may be nil for practical purposes; they may be used without further purification for bleaching or other reaction processes wherein substantially sulfur-free sulfur dioxide is desired or required.

For efficiency and economy of operation it is highly desirable that the recirculation of the liquid sulfur to and from the pool be at such rate that average auto-ignition temperatures obtaining within the pool are below 700° F., preferably in the range of about 550°–650° F. Higher temperatures of product gases issuing from the pool would be obtained if liquid sulfur were not recirculated through the pool and external cooling zone in accordance with preferred aspects of the invention. At such higher temperatures, which may occur within localized portion of the pool, as adjacent inlets for oxygen-containing gas, the product gases contain substantially larger quantities of elemental sulfur resulting from vaporization of sulfur content of the pool. In practice of the invention, by recirculation of liquid sulfur through the external cooling zone and thence into contact with sulfur dioxide-containing product, including within the pool, elemental sulfur content of such gases may be kept at relatively low values consistent with economical and other advantageous processing of such gases.

To achieve the desired control of combustion and character of the combustion product, it is preferred that the air or other oxygen-bearing gas employed be admitted to the sulfur pool adjacent its bottom as a plurality of spaced thin streams, as may be obtained, for example, by use of manifolded small orifices or of serrated bubble caps. Such admission facilitates complete consumption of oxygen in such gas and production of product of desirably low content in free sulfur.

For advantageous operation, it is preferred that at least part of the liquid sulfur withdrawn from the combustion zone be cooled to temperature within the lower of the temperature ranges in which it has low viscosity, e. g. to about 250°–310° F., and, at such temperature, be sprayed or even atomized into free space above and contiguous to the pool at suitable distance above liquid level in the latter, to fall countercurrently to and in intimate heat exchange relation with sulfur dioxide-laden gases leaving the pool. In this manner, efficient contact and heat exchange between the sulfur and gases and cooling of the latter may be had even during heating of the sulfur through the range of temperatures wherein it is at high viscosity. During a substantial portion, if not all, of the time its temperature is increasing within that range, the liquid is in suspended form; hence its viscosity has no substantial bearing on effectiveness of contact or heat exchange.

When it is desired that the sulfur dioxide product have very low content of free sulfur and be at low temperature, as for example, in supplying sulfur dioxide for bleaching or reduction of paper or other cellulose material, and for exothermic reaction with hydrogen sulfide to produce elemental sulfur, it is preferred that there be extensive contact between sulfur dioxide vapor produced in accordance with the invention and liquid sulfur maintained at temperature within the lower temperature-low viscosity range. To achieve such contact sulfur dioxide vapor, after its discharge from the pool of circulating liquid sulfur, may be passed through another circulating pool, layer or other body of liquid sulfur supplied from and returned to the cooling zone which receives the sulfur from the reaction zone. In practice of this aspect of the invention, it has been found to be highly advantageous economically and of substantial importance to control of the operation to so regulate the recirculation rates of sulfur through the respective bodies of the same that at least a major proportion of the heat produced within the system is absorbed by that portion of the sulfur circulating through the combustion zone, leaving only a minor proportion of such heat to be removed by the second body of sulfur. To this end, rate of recirculation through the combustion zone is preferably such that substantially all the heat of combustion is absorbed by the pool of sulfur therein so that the gases emanating therefrom approach minimum auto-ignition temperature of sulfur, for example 650° to 500° F. Then the second body of liquid sulfur removes sensible heat of product gases and only a practical minimum of latent heat of vaporization of contained elemental sulfur vapor and may be maintained at desired low viscosity with use of relatively low recirculation rates.

The invention contemplates, in accordance with certain of its aspects, supplying to the reaction zone or pool liquid sulfur produced by interaction of product sulfur dioxide and hydrogen sulfide, particularly when the reaction is effected at conditions which yield elemental sulfur in vapor form. To that end, product sulfur dioxide of low sulfur content is reacted with hydrogen sulfide (contained, for example, in a stream of hydrocarbon gases) in the presence or absence of catalyst, but preferably at relatively low temperature consistent with production of sulfur in vapor form. Resultant reaction product containing sulfur vapor is then subjected to contact with cooled liquid sulfur diverted from the circulation system comprising the above mentioned reaction and cooling zones to cool the gases and to condense and remove therefrom vapor phase sulfur contained therein. The total liquid sulfur stream may then be returned directly to the cooling zone for recirculation through the system, or part or all of it may be utilized in spray form for precooling the original sulfur dioxide product or otherwise introduced directly into the sulfur pool. Sulfur produced in excess of that needed for formation of sulfur dioxide may be withdrawn from any desired part of the system, for example, from the cooling zone.

In practice of this aspect of the invention, liquid sulfur may be employed as cooling and condensing medium for free sulfur prior to any or all catalytic or non-catalytic reaction stages of the system. Such cooling prior to reaction stages removes elemental sulfur and heat of the exothermic reactions. In fact, upon judicious cooling and sulfur removal by the circulating liquid sulfur before or between reaction stages, all such heat of reaction may be so removed without restort to waste heat boilers or other systems employing extraneous circuits or indirect heat exchange.

Concrete embodiments of the invention are represented by Figures 1 and 2 which show diagrammatic views of typical apparatus employed in carrying out the invention.

Referring to Figure 1 in detail, the apparatus in which sulfur dioxide is produced will be called a generator for convenience and is designated as 1. The generator may be constructed of any suitable material and may be lined with a sulfur-resistant material 2 such as a refractory material or stainless steel for protection. Within the generator is provided a relatively deep pool of liquid sulfur, for example about 15" to 24" deep, maintained at auto-ignition temperature (about 500° F. or above), preferably in the range of about 550°–650° F. Valved line 3 enables sulfur to be drained from the generator as desired or required. Air is supplied by a blower 4 and is passed at a suitable rate via valved pipe 5 through air distributing members 6 positioned sufficiently below the top surface of the liquid sulfur that all of the air is substantially completely consumed within the body of the liquid sulfur. Members 6 are of a suitable foraminous structure and as shown, for example, are open at their bottoms and provided with a plurality of orifices 7 to uniformly distribute the air in fine streams to the liquid sulfur. By providing for subdivision of the air stream into a plurality of small streams, complete utilization of the air within the body of the liquid sulfur is aided. The temperature of the pool of liquid sulfur being oxidized in generator 1 is desirably controlled at below 700° F., preferably at about 550°–650° F., by withdrawing sulfur therefrom, cooling it to below auto-ignition level, preferably in the lower temperature-low viscosity range of sulfur (about 250°–310° F.), and returning it at a predetermined rate to the pool. In order that the sulfur dioxide-containing product may be contacted with cooled sulfur after leaving the pool as well as within it, it is preferred, as shown, that part or all of the cooled sulfur being returned to the pool be introduced through spray nozzle 8 into free space above and contiguous to the pool at suitable distance above liquid level of the latter. We have found in order to maintain the pool of liquid sulfur in the preferred temperature range of about 550°–650° F., when cooling the sulfur withdrawn therefrom to about 250°–310° F. prior to its return either directly to the pool or partially or entirely through spray nozzle 8, the total recirculation rate will ordinarily be within the range of about 25 to 60 times the rate of sulfur consumption. Liquid sulfur, continuously withdrawn as overflow from the generator so that a constant depth is maintained therein, passes through conduit 9 into a sulfur pit 11 lined with a refractory material 35 and divided into two compartments, a cooling compartment 36 provided with a cooling coil 12 and an agitator 13, and an overflow compartment 37. The liquid sulfur entering the sulfur pit is cooled in compartment 36 to the desired or required temperature, and cooled liquid sulfur is collected in overflow compartment 37. Make-up sulfur may enter cooling compartment 36 through line 14.

The product gases resulting from the reaction of air with sulfur, having been cooled by contact with the liquid sulfur introduced through spray nozzle 8, comprise sulfur dioxide containing substantially no free oxygen (i. e. less than about 1% oxygen on free sulfur-free basis) and reduced quantities of free sulfur. The gases pass through conduit 15 to a sulfur condenser 16 containing suitable packing 17, such as ceramic bodies, subway grating or angle iron cross bars, and flow upwardly in the condenser countercurrent with liquid sulfur maintained at a temperature below auto-ignition level, preferably in the range of about 250°–310° F. The liquid sulfur is pumped to the top of the condenser from the overflow compartment of sulfur pit 11 through valved lines 38 and 39 by means of pump 18. Sprays 19 distribute the liquid sulfur downwardly at a sufficient rate to remove sulfur vapors from the upwardly flowing sulfur dioxide-containing gases, and the liquid sulfur then passed back to the cooling compartment of sulfur pit 11 through conduit 21. The resultant gases containing substantially no free oxygen (i. e. less than about 1% on free sulfur-free basis) and substantially no free sulfur (i. e. less than about 0.0002 lb. of sulfur per cubic foot of gas measured at standard conditions) may be recovered in any suitable manner, or may be used in subsequent operations.

In the apparatus shown in Figure 1, a hydrogen sulfide-containing gas is introduced through line 22 into the bottom of condenser 16 where it mixes with the sulfur dioxide-containing gases entering the condenser through conduit 15. The mixture of gases, after flowing countercurrent with the liquid sulfur passing downwardly in the condenser, passes via line 23 to heater 29 which serves to preheat the mixture of gases to desired extent. The mixture then passes to converter 24 containing a bed of suitable catalyst 25.

When the hydrogen sulfide-containing gas also comprises hydrocarbons, maximum catalyst temperatures are preferably controlled at a level which does not effect appreciable conversion of hydrocarbons in order to avoid temporary or permanent poisoning of the catalyst by carbonaceous deposits. Many catalysts of the type which promote the oxidation of hydrogen sulfide, for example activated bauxite or activated alumina, with or without additional catalytic metal oxides, are known to promote at elevated temperatures hydrocarbon reactions resulting in formation of such deposits. For this reason, and also since low inlet catalyst temperatures tend to favor increased yields, minimum operable inlet catalyst temperatures are preferred and may be realized by cooling the sulfur dioxide product by means of the liquid sulfur scrubbing step described above.

Product gases resulting from the catalytic conversion and containing substantial quantities of sulfur vapors pass through conduit 26 into the bottom of sulfur condenser 27 containing suitable packing 28, such as ceramic bodies, subway grating or angle iron crossbars. The gases flow upwardly in the condenser countercurrent with liquid sulfur maintained at a temperature below auto-ignition level, preferably in the range of about 250°–310° F., and pumped to the top of the condenser from overflow compartment 37 of sulfur pit 11 through valved line 38 by means of pump 18. Sprays 31 distribute the liquid sulfur downwardly at sufficient rate to remove sulfur vapors from the upwardly flowing gases, and the liquid sulfur then passes back to cooling compartment 36 of the sulfur pit through conduits 32 and 21. Residual gases unremoved by the liquid sulfur in condenser 27 pass out through conduit 33 and are discharged to the atmosphere or collected in a suitable manner if they contain valuable constituents. If desired, product sulfur may be withdrawn from the sulfur pit through valved lines 38 and 34 by means of a pump 18.

Referring to Figure 2 in detail, the source of air used in the generation of sulfur dioxide is a blower 51. Air is passed in valved line 52 through a pool of liquid sulfur maintained at auto-ignition temperature, preferably in the range of about 550°–650° F., on a bubble cap tray 53 at the bottom of a tower 54. The tower, provided with a protective lining of refractory material 56 below tray 53, may be operated at atmospheric pressure or above. The risers and overflow weir on tray 53 are sufficiently high to form and maintain a relatively deep layer of sulfur, say about 15" to 24" deep, so that essentially all the reaction with air to form sulfur dioxide takes place therein. A valved line 55 enables sulfur to be drained from tray 53 as desired or required. The temperature of the liquid sulfur being oxidized is desirably controlled at below 700° F., preferably at about 550°–650° F., by introducing to the pool liquid sulfur maintained at a temperature below auto-ignition level, preferably in the range of about 250°–310° F., at a predetermined rate, as through a spray nozzle 57 into free space above and contiguous to the pool at suitable distance above liquid level of the latter. Overflow liquid sulfur is continuously withdrawn from bubble cap tray 53 through line 58 and is pumped by means of pump 84 to a sulfur pit 59 where it may be cooled as described below.

In lieu of spray nozzle 57, liquid sulfur can be pumped directly to tray 53 via an overflow weir (not shown).

It is preferred, however, to introduce the liquid sulfur through the spray nozzle, as shown, since by means thereof: (1) sulfur is distributed over bubble cap tray 53 at a uniform temperature with the result that tray temperature gradation is negligible, (2) presence of liquid sulfur in the space above tray 53 offers protection against excessive temperatures caused by incomplete combustion on the tray itself, and (3) the spray system more effectively cools the gases flowing upwardly.

The product gases, resulting from the reaction of air with sulfur, having been cooled by contact with liquid sulfur introduced through spray nozzle 57, comprise sulfur dioxide containing reduced quantities of sulfur vapors and substantially free of elemental oxygen. The gases pass upwardly in tower 54 to bubble cap tray 61 where they are intimately contacted with liquid sulfur maintained at below auto-ignition level, preferably in the range of about 250° to about 310° F. The liquid sulfur is passed downwardly in countercurrent with the flow of gases at a sufficient rate to remove from the gases substantially all of the sulfur vapors entrained therein, and together therewith passes from tower 54 via conduit 62. From conduit 62 the liquid sulfur flows to sulfur pit 59 lined with a protective refractory material 63 and dividend into two compartments, a cooling compartment 81 supplied with an agitator 64, and an overflow compartment 82. Water is injected through valved line 65 into cooling compartment 81, and cooling is accomplished by evaporation of the water. Resultant steam is released to the atmosphere through conduit 66. The cooled liquid sulfur is collected in overflow compartment 82 and may then be removed as sulfur product through valved line 67 or circulated by means of pump 68 through lines 67 and 69 and valved line 83 to be passed downwardly through spray nozzle 57 countercurrent with the flow of generated sulfur dioxide.

A hydrogen sulfide-containing gas may be introduced below bubble cap tray 61 through valved line 71 at which point it mixes with generated sulfur dioxide passing upwardly. Reaction between the sulfur dioxide and hydrogen sulfide with formation of product gases containing sulfur vapors takes place at this point, the extent of the reaction being determined essentially by the concentration of the reactant gases, the length of residence of the reactant gases at such point and the temperature maintained therein. Liquid sulfur maintained at below auto-ignition temperature, preferably at a temperature ranging from about 250°–310° F., is pumped from overflow compartment 82 by means of pump 68 through lines 67 and 69 and is introduced to the tower through valved line 72. The liquid sulfur passes downwardly through bubble cap tray 61 in countercurrent with the flow of product gases at a sufficient rate to remove sulfur vapors from the product gases while cooling the gases by removing heat of reaction therefrom.

If desired or required, the hydrogen sulfide containing gas may alternatively be introduced into the tower above bubble cap tray 61 through valved line 73.

The resultant cooled gases pass upwardly in tower 54 through internal risers 78 within suitable catalyst 85 maintained at conditions favorable to the reaction of sulfur dioxide with hydrogen sulfide to form elemental sulfur. The gases, thereby preheated to desired temperature, pass upwardly to plate 86 and are deflected downwardly through the catalyst. Beneath the catalyst there may be provided mist removal packing (not shown) which suitably may consist of coke or fibre glass. Such mist removal packing serves to entrap entrained sulfur that may be present as the result of the atomizing action of spray 57 or of bubble cap action on tray 61, as the case may be. Such packing, if used, minimizes sulfur deposit problems resulting from mechanical treatment or circulating liquid sulfur. In installations designed for a relatively coarse spray and relatively low gas velocities, the packing is not necessary.

Product gases resulting from the catalytic conversion and containing substantial quantities of sulfur vapors pass upwardly in tower 54 through external riser 87 and then through bubble cap trays 74 and 75 where liquid sulfur introduced through valved conduit 72 passes downwardly in countercurrent with the flow of gases at sufficient rate to remove the sulfur vapors and together therewith passes through pipe 76 along bubble cap tray 61 and finally through conduit 62 to cooling compartment 81 of sulfur pit 59. Residual gases pass out of the tower through conduit 77 and are discharged to the atmosphere, as shown, or are collected in a suitable manner if they contain valuable constituents. Mist removal packing (not shown) may conveniently be provided above bubble cap tray 75, if desired.

Although only one catalyst bed is shown in Figures 1 and 2, two or more catalyst beds may be employed if necessary to obtain substantially complete conversion of the hydrogen sulfide-containing gases to elemental sulfur. When such a plurality of catalyst beds is provided, they are used in cooperation with additional sulfur condensers or appropriate bubble cap trays to cool the reactant gases and remove elemental sulfur therefrom before they are introduced into the catalyst beds.

While in the description of Figures 1 and 2 we have referred to air as the means for obtaining oxidation of the liquid sulfur, any oxygen-containing gas may be substituted therefor, as for example, commercial oxygen or oxygen-enriched air.

It will be understood that while we have described in detail certain specific embodiments of our invention, it is not our intention to have our invention limited to or circumscribed by the specific details of construction, arrangement of parts or procedure herein described and illustrated in view of the fact that our invention is susceptible to many modifications without departing from the scope of this disclosure and the scope of the appended claims.

The following examples represent typical operation of the sulfur dioxide generator section of Figure 2, terminating above spray nozzle 57.

*Example 1.*—Liquid sulfur at 290° F. was pumped from overflow compartment 82 of sulfur pit 59 by means of pump 68 into spray nozzle 57 and onto bubble cap tray 53 provided with risers and overflow weir to form a depth of 22". Spray nozzle 57 was positioned 24" above the liquid level of the sulfur. The sulfur in the pit was maintained at 290° F. by surface water addition through valved line 65. A water flow of about 1.6 gallons per minute was adequate to maintain the constant cooling pit temperature. When the circulation through bubble cap tray 53 was established, air was introduced through valved line 52 below the surface of the liquid sulfur, and the sulfur was ignited by an open flame represented by burner 79. The burner was then turned off, and the air and sulfur feed were adjusted until the temperature of the liquid sulfur on tray 53 rose to 640° F. while maintaining a constant overflow of sulfur through line 58 to cooling compartment 81 of sulfur pit 59. To attain the aforesaid temperature, the sulfur flow rate was approximately 12 gallons per minute, and the air flow rate was approximately 355 cubic feet per minute. The recirculation rate of the sulfur corresponded to about 31 times the rate of sulfur consumption. Generator temperatures reached equilibrium within two hours with the following values:

| | ° F. |
|---|---|
| Sulfur to spray | 290 |
| Sulfur on tray | 640 |
| Vapor above spray | 600 |

The product gases contained about 20.8% sulfur dioxide with approximately 0.2% oxygen on free sulfur-free basis. These gases at standard conditions carried approximately 0.065 lb. of sulfur per cubic foot of gas, such quantity of sulfur being about one-fifth or less of the minimum sulfur content of product gases obtained when recirculation of liquid sulfur is not employed.

*Example 2.*—The apparatus was brought up to equilibrium as described in Example 1. The air and sulfur feed were then adjusted to maintain a generator operating temperature of 550° F. To obtain such temperature, the sulfur flow rate through the spray was approximately 6.9 gallons per minute; the air flow rate was approximately 160 cubic feet per minute. The recirculation rate of the sulfur corresponded to about 48 times the rate of sulfur consumption. Average generator temperatures were as follows:

| | ° F. |
|---|---|
| Sulfur to spray | 290 |
| Sulfur on tray | 560 |
| Vapor above spray | 540 |

The product gases contained about 20.8% sulfur dioxide with approximately 0.2% oxygen on free sulfur-free basis. These gases at standard conditions carried approximately 0.03 lb. of sulfur per cubic foot of gas.

The following example represents typical operation of the apparatus substantially as shown in Figure 2 and includes reaction of generated sulfur dioxide with hydrogen sulfide to produce elemental sulfur. In the specific apparatus employed, bubble cap tray 75 was eliminated, and circulating liquid sulfur was introduced to the tower above bubble cap tray 74 on the opposite side of the tower as illustrated.

*Example 3.*—Approximately 13.6 cubic feet per minute of air was introduced below generator tray 53 which contained a pool of liquid sulfur 20" deep and maintained at 600–650° F. by passing cooled liquid sulfur through spray nozzle 57. The spray nozzle was positioned 40" above the liquid level of the sulfur. The resultant gases containing about 20.8 to 21.0% sulfur dioxide and about 0.2% oxygen on free sulfur-free basis were mixed with acid gas containing about 90% of hydrogen sulfide which was introduced at 6.4 cubic feet per minute through valved line 71. The mixed gases entered bubble cap tray 61 where they were cooled to 280°–300° F. by circulation of cooled liquid sulfur from overflow compartment 82 of sulfur pit 59 over the bubble cap tray. At this point the sulfur content of the gases at standard conditions was about 0.0002 lb. per cubic foot of gas. The gases were then preheated by indirect heat exchange and introduced to catalyst 85 at about 400° F., this temperature increasing within the catalyst bed due to heat of reaction to about 800° F. at the exit. Product sulfur resulting from the catalytic reaction of the hydrogen sulfide and sulfur dioxide was condensed on bubble cap tray 74 where it mixed with the circulated sulfur. The product sulfur together with the circulated sulfur was then removed from the system through line 62. Residual gases were exhausted to the atmosphere. Overall conversion to elemental sulfur on the basis of total acid gas introduced was about 85%.

In the foregoing specification and in the appended claims, all references to "auto-ignition temperature of sulfur" are intended to include any temperature at which auto-ignition of sulfur occurs, i. e. at about 500° F. or above.

We claim:

1. A process for the production of elemental sulfur from hydrogen sulfide by reaction of a gaseous stream containing the same with a gaseous stream containing sulfur dioxide produced by combustion of sulfur which comprises: producing the second-named gaseous stream substantially free of molecular oxygen and having low elemental sulfur content by (1) reacting to substantially complete consumption of its oxygen content within a pool of liquid sulfur maintained at auto-ignition temperature below 700° F. a stream of oxygen-containing gas admitted to said pool and (2) maintaining said pool at the aforesaid temperature by continuously withdrawing liquid sulfur from the pool, cooling the liquid sulfur withdrawn to below auto-ignition temperature, returning the cooled sulfur to said pool, and effecting said withdrawal and return of sulfur at rate in excess of about 25 times the rate of sulfur combustion to absorb at least a major portion of the heat of combustion; cooling the combustion products by direct contact of the same with a stream of circulating cooled liquid sulfur to condense from said combustion products substantially all of the sulfur vapors contained therein; reacting the first- and second-named gaseous streams under conditions to form a gaseous product containing elemental sulfur; cooling said gaseous product and extracting elemental sulfur therefrom by contact with a stream of circulating cooled liquid sulfur; and withdrawing as the sulfur product of the operation a portion of the circulating cooled liquid sulfur.

2. A process according to claim 1, wherein the cooled sulfur returned to the sulfur pool is introduced downwardly upon the top surface of the pool and in countercurrent contact with the combustion products leaving the pool.

3. A process for the production of elemental sulfur from hydrogen sulfide by reaction of a gaseous stream containing the same with a gaseous stream containing sulfur dioxide produced by combustion of sulfur which comprises: producing the second-named gaseous stream substantially free of molecular oxygen and having low elemental sulfur content by (1) reacting to substantially complete consumption of its oxygen content within a pool of liquid sulfur maintained at temperature of about 550°–650° F. a stream of air admitted to said pool and (2) maintaining said pool at the aforesaid temperature by continuously withdrawing liquid sulfur from the pool, cooling the liquid sulfur withdrawn to temperature of about 250°–310° F., returning the cooled sulfur to said pool, and effecting said withdrawal and return of sulfur at rate of about 25 to 60 times the rate of sulfur combustion to absorb substantially all of the heat of combustion; cooling the combustion products by direct contact of the same with a stream of circulating cooled liquid sulfur having a temperature of about 250°–310° F. to condense from said combustion products substantially all of the sulfur vapors contained therein; reacting the first- and second-named gaseous streams under conditions to form a gaseous product containing elemental sulfur; cooling said gaseous product and extracting elemental sulfur therefrom by contact with a stream of circulating cooled liquid sulfur having a temperature of about 250°–310° F.; and withdrawing as the sulfur product of the operation a portion of the circulating cooled liquid sulfur.

4. A process according to claim 3, wherein the streams of circulating liquid sulfur are combined after having performed their respective cooling duties and are cooled within a single cooling zone.

5. A process for the combustion of liquid sulfur to produce a stream of sulfur dioxide-containing gases substantially free of molecular oxygen and having low elemental sulfur content which comprises reacting to substantially complete consumption of its oxygen content within a pool of liquid sulfur maintained at auto-ignition temperature below 700° F. a stream of oxygen-containing gas admitted to said pool, maintaining said pool temperature by continuously withdrawing liquid sulfur from the pool, cooling the liquid sulfur withdrawn to below auto-ignition temperature, returning the cooled liquid sulfur to said pool, and effecting said withdrawal and return of sulfur at rate in excess of about 25 times the rate of sulfur combustion to absorb at least a major portion of the heat of combustion.

6. A process for the combustion of liquid sulfur to produce a stream of sulfur dioxide-containing gases substantially free of molecular oxygen and elemental sulfur which comprises reacting to substantially complete consumption of its oxygen content within a pool of liquid sulfur maintained at temperature of about 550°–650° F. a stream of air admitted to said pool, maintaining said pool temperature by continuously withdrawing liquid sulfur from the pool, cooling the liquid sulfur withdrawn to a temperature of about 250°–310° F., returning the cooled liquid sulfur to said pool, and effecting said withdrawal and return at rate of about 25 to 60 times the rate of sulfur combustion to absorb substantially all of the heat of combustion, and then cooling the resultant sulfur dioxide-containing gases by direct contact of the same with liquid sulfur having a temperature of about 250°–310° F. to condense from said gases substantially all of the sulfur vapors contained therein.

References Cited in the file of this patent

UNITED STATES PATENTS

| 1,083,249 | Hall | Dec. 30, 1913 |
| 1,823,698 | Nordlander | Sept. 15, 1931 |
| 1,904,512 | Nordlander | Apr. 18, 1933 |
| 1,972,883 | Gleason | Sept. 11, 1934 |
| 2,143,365 | Agren | Jan. 10, 1939 |
| 2,310,173 | Chatelain | Feb. 2, 1943 |
| 2,389,810 | Odell | Nov. 27, 1945 |
| 2,595,447 | Braun | May 6, 1952 |

FOREIGN PATENTS

| 5,225 | Great Britain | of 1892 |